United States Patent Office 3,375,202
Patented Mar. 26, 1968

3,375,202
SEPARATING SUBSTANCES IN SOLUTION AS SALTS BY USING A COLLOIDAL DISPERSION OF MIXED FERROCYANIDES
Francoise Laveissiere and André Bonnin, Antony, and Philippe Poirier, Versailles, France, assignors to Societe Saint Gobain Techniques Nouvelles, Courbevoie, Siene, France
No Drawing. Continuation-in-part of application Ser. No. 352,345, Mar. 16, 1964. This application Sept. 29, 1964, Ser. No. 400,204
Claims priority, application France, Oct. 1, 1963, 949,225
18 Claims. (Cl. 252—301.1)

ABSTRACT OF THE DISCLOSURE

This invention is directed to the process of extracting particular substances from a solution by the utilization of a fine colloidal dipersion of a solid which has an affinity for the substances to be separated. The process generally comprises the steps of contacting the solution with the dispersion so as to fix the substances to be separated on the solid and then separating the dispersion from the solution.

---

This application is a continuation-in-part application of Ser. No. 352,345, filed on Mar. 16, 1964, now abandoned.

This invention relates to an effective process for chemically separating substances in solution, more particularly for separating substances from solutions in which the substances are present in a very low concentration. The process according to this invention can be used with great advantage for decontaminating radioactive waste before the same reaches public sewage systems and, more widely, for the treatment of radioactive solutions to extract the radioactive constituents therefrom.

A number of processes are known for chemical treatments of such solution. These treatments are directed to the removal of valuable products or simply removing useless or even dangerous products from the solutions. Some of the commonest forms of treatment are:

(1) Precipitation of insoluble compounds within the solution, the substance required to be separated being precipitated either alone or with an auxiliary substance which may or may not be of similar chemical nature and which assists separation.

(2) Fixing the substance to be separated on insoluble solids which can be either organic or mineral ion exchangers or other absorbents, (3) Extraction by solvents, (4) Dialysis and electrodialysis.

Treatments 1 and 2 give substantially quantitative separations which are adequately selective in many cases, more particularly for most mineral compounds. However these treatments have by their nature a number of serious practical disadvantages arising out of the presence of, and the need to handle solids, filtering difficulties, the complexity of changing over from intermittent operations to a continuous system and the like.

Treatments 3 and 4 are usually not so difficult technologically but they are inadequately selective or effective in many case, inter alia in separation of the ions of very electro-positive alkaline and alkaline-earth metals and lanthanides for which the selectivity of dialysis is poor. The solvent extraction coefficients are often too low, or else the extraction agents are too expensive or the solvent extraction selectivities are too low.

The chemical separation process according to this invention obviates these various disadvantages by combining the selectivity and effectiveness provided by treatment 1 and/or 2 (precipitation and fixation on insoluble solids) with the technological advantages of treatment 3 and/or 4 (extraction by solvent and dialysis). This combination can be embodied in all possible ways without any departure from the scope of the invention, and a description will now be given of some preferred embodiments of the general process according to the invention, the description not being limitative. The reference A will be used as a general reference to denote a substance in solution in a liquid 1 in which the substance A is mixed with a number of other substances from which selective separation of substance A is required, and the general reference B will denote an auxiliary substance which is insoluble in the liquid 1 and which has a selective affinity for the substance A. The reference 2 will denote a second liquid which is miscible in the solvent 1 and in which the substance B can readily be dissolved or dispersed, preferably in colloidal form.

In a first embodiment of the invention, a dispersion of substance B in a solvent 1 is first prepared separately. The substance B has a selective affinity for the substance A which it is required to separate and which is present in dissolved form in the solvent 1. The two liquids are mixed, and the substance A becomes fixed to the particles of B in suspension in the liquid 1. An addition is then made of an appropriate surface-active agent which produces flocculation of the particles B+A, whereafter the flocculate is extracted by means of a solvent 2 immiscible in the solvent 1.

In a second embodiment of the invetnion, the substance A is coprecipitated in its solution in a solvent 1 by a compound B having a selective affinity for A in the presence of an appropriate surface-active agent which can extract the precipitate and disperse the same in a liquid 2 immiscible in the solvent 1.

In a third form of the invention, a dispersion of a substance B in a solvent 1 is first prepared, and flocculation is initiated by the addition of an appropriate surface-active agent which enables the flocculate to be extracted and to be dispersed in a liquid 2 immiscible in a solvent 1. The resulting dispersion of B in the liquid 2 is then used to extract A from its solution by any known liquid-liquid extracton technique.

In a fourth embodiment of the invention, a dispersion of substance B in a predetermined volume of the liquid 1 is first prepared. The substance A which it is required to separate is also dissolved in a second volume of the same liquid 1. The two fractions of the liquid 1 are placed one on either side of the diaphragm of a dialysis vessel. The substance A passes through the diaphragm but the same prevents the substance B from passing through. In the equilibrium condition, nearly all of A is fixed on the particles B in the dialyser compartment in which B was introduced intially and from whch B could not escape.

In a fifth embodiment of the invention, which is of use if the substance A is electrically charged, compound B which has a selective affinity for A is formed inside a porous wall which selectively allows A to pass through it, the movement of A being produced by the application of an electric field.

The process according to the invention is of widespread use, but its selectivity, effectiveness and simplicity of use make it very advantageous for chemical separations in industry.

As a rule, the fission products which must be removed from the liquid wastes from the different kinds of nuclear research centers or installations are present in the waste in a very small concentration. This applies inter alia to cesium and strontium. A very rapid and effective separation method should therefore be available, and the process according to the invention meets these requirements.

To explain the foregoing a description will now be given in detail of how the process according to the invention can be carried into effect for the treatment of radioactive solutions to remove therefrom radioactive ingredients such as cesium and strontium.

First, cesium can be removed from solutions containing it by being precipitated by means of ferrocyanide or phospho-tungstate. Unfortunately, these procedures are very slow and can be used only in discontinuous operations. As a consequence the equipment used must be very bulky and, therefore, costly in the light of all the safeguards which must be observed in the handling of radioactive substances. In addition, the amounts of reagents which have to be used for these precipitations depend, as a rule, much more upon the volumes of liquids to be treated than upon the quantity of cesium actually contained in the liquids. By way of contrast, the separation process according to the invention is very well adapted to continuous operation, so that the size of the equipment required for the process according to the invention can be reduced as compared with the prior art and, if required, the number of consecutive extraction stages can be juxtaposed should this prove useful. Also, reagent consumption is more in line with the amount of cesium to be separated, so that—inter alia in the case of decontaminating an active waste—the volume of solid waste produced which has to be stocked is much less than previously.

The process according to the invention for separating cesium from radioactive liquid wastes has an advantage over the processes of prior art in that it provides a higher partition coefficient, thus making it possible to reconcile cesium production requirements with the need for decontamination of highly radioactive effluents. A further advantage is that this process is economical and does not call for the use of costly reagents as in the case of extraction with sodium tetraphenyl-boride. In addition, the process can be applied to solutions having a high acid concentration, contrary to the case of extraction with dipicrylamine or with 4-dry-butyl-2 alpha-methyl-benzyl-phenol which are employed in an alkaline medium, and does not present the technical difficulties which are met with in the extraction of cesium in the form of polybromide or polyiodide.

For separating cesium in an aqueous nitric acid solution by the process according to the invention, the following are some of the substances which have been used, although the following lists are not to be taken as limiting the scope of the invention:

As auxiliary substances having a selective affinity for cesium—aqueous sols of mixed ferrocyanides containing cations from transition elements, such as iron, cobalt, nickel, copper, zinc and so on, and monovalent cations, such as sodium, potassium, ammonium, and so on;

As solvent for extracting the organic water-immiscible solvents (which can be chlorinated solvents such as chloroform, carbon tetrachloride, trichloroethylene, dichloroethane and so on)—alcohols such as normal octylalcohol, 2-ethyl-hexyl alcohol, amyl alcohol and so on, ketones such as methylisobutyl-ketone and so on, hydrocarbons such as benzene, toluene, xylene, heptane, dodecane, and so on which may or may not have dissolved in them additives such as cetyl alcohol, lauric alcohol, oleic alcohol, oleic acid and so on, and As flocculating agent—a quaternary ammonium salt such as cequartyl (laurylbenzyldimethylammonium chloride) and so on.

For separating cesium of radioactive liquid wastes, the process according to the present invention can be carried out by the following way.

The cesium is extracted from its aqueous solution by a dispersion, in an organic solvent which is immiscible with water, of a mixed ferrocyanide consisting of cations of an element of transition and of univalent cations, this dispersion having been prepared starting from a dispersion of the same ferrocyanides in water by flocculation with the aid of a suitable quaternary ammonium salt and by extraction of the flocculate into the organic solvent which is chosen.

The extraction of cesium from its organic phase in which it is in suspension on a fixing solid can be obtained in a single solvent extraction operation. The said organic phase is brought in contact with an aqueous phase in the presence of suitable quaternary ammonium salt which is added to said organic phase and in the presence of cyanide anions.

In a first mode of preparation, the cyanide is added to the aqueous phase in the form of alkaline cyanide or preferably in the form of ammonium cyanides. The ferrocyanide ions and copper ions which are complexed by the cyanide ions remain in the organic phase while the cesium ions pass into the aqueous phase. Ammonium cyanide is preferably employed since the ammonium salts can readily be eliminated from the cesium salt which is produced.

In a second mode of preparation, the cyanide is brought in the form of quaternary ammonium cyanide to the organic phase. To accomplish this, the quaternary ammonium salt, for example dilauryldimethylammonium chloride, is dissolved in a suitable organic solvent such as butyl alcohol. When the organic solution is contacted with an aqueous solution of alkaline cyanide, the following equilibrium is established:

Quaternary ammonium chloride+alkaline cyanide
 =Quaternary ammonium cyanide+alkaline chloride The organic solution obtained is added to the cesium-charged organic phase, then the aggregate is contacted with water. There is thus obtained in a single operation an aqueous phase which contains the entire quantity of cesium and which contains no detectable quantity either of copper or of ferrocyanide. In the aqueous phase which is obtained, cesium is present in the form of cyanide. The cesium is then transformed by means of a suitable treatment into the chemical form (sulphate or carbonate, for example) which may prove preferable for the subsequent utilisation thereof.

If the cesium is initially present in nitric acid solution, which is generally the case when processing fissile materials, small quantities of a quaternary ammonium salt are, in that case, added to the aqueous phase in order to improve the stability of the organic phase. The concentration of this ammonium salt, for example laurylbenzyldimethylammonium chloride (Cequartyl A) or distearyldimethylammonium chloride (Arquad 2HT75) the anion not being, however, necessarily limited to the chloride, is usually comprised between $1.5 \times 10^{-4}$ moles per liter and $10^{-3}$ m./l., the value of $2 \times 10^{-4}$ moles per liter being particularly suitable. In order to prevent the formation of troublesome precipitates at the boundaries which result from the presence of ferric ions in the starting solution, reducing agents are employed which transform these ferric ions into ferrous ions. Among these reducing agents can be mentioned as particularly suitable the salts of hydroxylamine, ascorbic acid, sulfamic acid; nitrites, certain nitrogen oxide compounds and so forth. It is also possible to make use of mixtures of these reagents.

The operations involving contacting of the two liquid phases can be carried out in conventional liquid-liquid extraction apparatus such as stirring tanks, mixersettlers, columns, and so forth.

The contacting times which are necessary for an extraction yield of more than 99% are of the order of a few minutes, although such times are obviously dependent on the system considered and the stirring efficiency.

A better understanding of the present invention will be gained from a perusal of the examples which are given hereinafter.

Example 5 illustrates the re-extraction of cesium of an organic phase in which it is in suspension on a fixing solid according to the first mode of operation.

Example 6 illustrates the re-extraction of cesium of an organic phase in which it is in suspension on a fixing solid according to the second mode of operation.

The practical arrangements which will be described in connection with the following examples must be considered as forming part of the invention, it being understood that any and all equivalent arrangements could equally well be employed without departing from the scope of this invention.

Example 1

A colloidal dispersion of copper ferrocyanide and of potassium ferrocyanide is prepared by mixing equal volumes of an aqueous copper sulphate solution ($3 \times 10^{-3}$ m.) and of an aqeuous potassium ferrocyanide solution ($2 \times 10^{-3}$ m.). To 500 parts of this dispersion are added 40 parts of a cequartyl solution (laurylbenzyldimethylammonium chloride) ($5 \times 10^{-3}$ m.). The colloid flocculates. The flocculate is removed and dispersed in 10 parts of dodecane to which 0.15 part of lauric alcohol has been added. The resulting colloidal dispersion is placed in contact, in a known kind of extraction apparatus (mixerdecanter or the like), with 10 parts of an aqueous solution having the following composition:

| | Concentration |
|---|---|
| $CsNO_3$ | $10^{-2}$ m. |
| $HNO_3$ | 0.26 m. |
| $Ba(NO_3)_2$ | 9 g. Ba/l. |

At the conclusion of the operation, 99.96% of the cesium has passed into the organic phase and only 0.04% of the original quantity remains in the aqueous phase.

Example 2

A colloidal dispersion of copper ferrocyanide and potassium ferrocyanide is prepared by mixing 30 parts of an aqueous copper sulphate solution ($10^{-2}$ m.) with 200 parts of an aqueous potassium ferrocyanide solution ($10^{-3}$ m.). To 50 parts of this dispersion are added 4 parts of a cequartyl solution ($5 \times 10^{-3}$ m.). The colloid flocculates. The flocculate is extracted and dispersed in 50 parts of methylisobutylketone. The resulting organic colloidal dispersion is used to extract the cesium from 50 parts of an aqueous cesium nitrate solution ($1.5 \times 10^{-6}$ m.). After extraction, 99.6% of the cesium is in the organic phase and only 0.4% remains in the aqueous phase.

Example 3

0.5 g. of a synthetic zeolite (Union Carbide molecular screen 4A) is dispersed in 100 cc. of water. To this solution are added 10 cc. of a $5 \times 10^{-3}$ m. solution of laurylbenzyldimethylammonium chloride. The zeolite is then extracted and dispersed in 20 cm.$^3$ of dodecane to which 0.3 cm.$^3$ of lauric alcohol has been added. The resulting dispersion is used to extract the strontium from 20 cm.$^3$ of an aqueous strontium nitrate solution having a concentration of $10^{-3}$ m. After extraction only 1% of the strontium originally present remains in the aqueous phase.

Example 4

A colloidal dispersion of copper and potassium ferrocyanide is prepared by mixing 30 parts of a $10^{-2}$ m. aqueous solution of copper sulphate and 200 parts of a $10^{-3}$ m. aqueous solution of potassium ferrocyanide. A proportion of this dispersion is placed on one side of the diaphragm of an ordinary two-compartment dialyser, and the same volume of water is placed on the other side of the diaphragm. Cesium nitrate is introduced into each of the two compartments in amounts such that the cesium concentration is $10^{-4}$ m. on either side of the diaphragm. The equilibrium condition is then allowed to establish itself. Once equilibrium has been reached only 0.35% of the original cesium is found in the compartment not containing ferrocyanide. All the remainder of the cesium has been transferred to the other compartment of the dialyser.

Example 5

The organic phase was prepared in the following manner. Twenty-five volumes of an aqueous solution of a $2 \times 10^{-3}$ m. aqueous solution of ammonium ferrocyanide are admixed with twenty-five volumes of a $3 \times 10^{-3}$ m. aqueous solution of a copper salt. Four volumes of a $5 \times 10^{-3}$ m. aqueous solution of cequartyl A are added thereto, resulting in the flocculation of the colloid. The flocculate is extracted into five volumes of dodecane containing 1.5% by volume of lauric alcohol.

25 cm.$^3$ of an aqueous phase containing:

| | | |
|---|---|---|
| Cs | m./l. | $3 \times 10^{-3}$ |
| Mg | g./l. | 13.5 |
| $HNO_3$ | m./l. | 2 |
| Cequartyl | m./l. | $2 \times 10^{-4}$ | are treated with an equal volume of organic phase. After stirring for 3 minutes, 0.1% cesium is found in the aqueous phase and 99.9% in the organic phase.

There is additionally prepared a mixture of 10 cm.$^3$ of Arquad 2C50 (dilauryldimethylammonium chloride in 50% solution in isopropanol) and 5 cm.$^3$ of butyl alcohol. This mixture is stirred with 25 cm.$^3$ of an aqueous solution containing 1 mole of potassium cyanide per liter. There is obtained 12 cm.$^3$ of an organic phase containing 0.48 mole of cyanide ion per liter. The said 12 cm.$^3$ are added to the 25 cm.$^3$ of cesium-charged organic phase derived from the previous extraction. The aggregate is stirred with 10 cm.$^3$ of water. After stirring for a period of 10 minutes, there is found 0.3% cesium in the organic phase and 99.7% in the aqueous phase. The aqueous phase does not contain any detectable quantity of copper ions or ferrocyanide ions.

Example 6

The aqueous phase to be treated has the following composition:

| | G./l. |
|---|---|
| Fe | 2.5 |
| Ni | 0.75 |
| Cr | 0.50 |
| Mo | 0.40 |
| Al | 2.0 |
| Mg | 15.0 |

Cequartyl $2 \times 10^{-4}$ mole/liter and hydroxylamine chlorhydrate 1.5 mole/l. are added to the aqeuous phase.

The aqueous phase is stirred during 10 minutes with an equal volume of organic phase prepared according Example 5. 0.7% cesium is found in the aqueous phase and 99.3% in the organic phase 2 cc. of Cequartyl A and 5 cc. of butyl alcohol for 25 cc. of organic phase are added to the organic phase. The part of the butyl alcohol is to ensure the dissolution of quaternary ammonium ferrocyanide, cuprocyanide and cupricyanide which will be subsequently formed in the organic phase. A plurality of other solvents can be used to ensure this dissolution. The concentration of these solvents in the organic phase will be between 5 and 50%, the concentrations of 10 to 20% being the most convenient.

The organic phase is stirred with a volume of 0.4 ammonium cyanide aqueous solution equal to the initial volume of the treated aqueous phase. After stirring of 10 minutes, 0.2% cesium is found in the organic phase and 99.8% in the aqueous phase. The aqueous phase does not contain any detectable quantity of copper ions or ferrocyanide ions.

We claim:
1. A process for the separation of a substance present in a solution in its salt form which comprises:
   (a) contacting said solution containing the substance to be separated with a fine colloidal dispersion of a solid composed of a mixed ferrocyanide of mono- valent cations and cations of an element selected from the group consisting of copper, zinc, iron, cobalt and nickel, said solid being insoluble in the solvent of the solution containing the substance to be separated, so as to fix the substance to be separated on said solid;

(b) flocculating said solid having fixed thereon the substance to be separated; and (c) extracting said solid having fixed thereon the substance to be separated from the remaining solution by means of a solvent which is immiscible with the solvent of the solution being treated.

2. A process according to claim 1 wherein the substance to be separated is extracted from said solid ferrocyanide by treating said solid in the presence of cyanide anions with an aqueous medium.

3. A process according to claim 1 wherein the substance to be separated is selected from the group consisting of cesium and strontium.

4. A process according to claim 1 wherein the solid is dispersed in a liquid which is the same as the solvent of the solution from which the substance is to be separated and wherein the substance to be separated is fixed on said solid by contact through the process of dialysis.

5. A process according to claim 4 wherein the substance to be separated is electrically charged and the fixation of said substance on said solid is accelerated by the application of an electrical field between the solution and the dispersion.

6. A process as set forth in claim 1, characterised in that the fixing solid is inside a porous wall which allows the substance to be removed to pass through it selectively.

7. A process for extracting cesium from an aqueous solution wherein said cesium is present in salt form, which process comprises:

(a) contacting said solution containing the cesium with a colloidal dispersion of mixed ferrocyanides of monovalent cations and cations of an element selected from the group consisting of copper, zinc, iron, cobalt and nickel in a water immiscible liquid so as to fix the cesium on said ferrocyanide;

(b) separating the water immiscible liquid containing said dispersion of ferrocyanide; and (c) extracting said cesium from said ferrocyanide by adding to said dispersion in the presence of cyanide anions an aqueous medium, said cesium thereby passing into the aqueous medium.

8. A process according to claim 7 wherein the aqueous and water immiscible phases obtained in step (c) are separated.

9. A process according to claim 7 wherein the cesium is initially present in the form of its nitrate salt.

10. A process according to claim 7 wherein a quaternary ammonium salt selected from the group consisting of laurylbenzyldimethyl ammonium chloride and dilauryldimethyl ammonium chloride is added to said separated water immiscible liquid containing the dispersions of ferrocyanide as obtained from step (b) of claim 7.

11. A process according to claim 7 wherein the aqueous solution containing the cesium to be separated contains ferric ions and a reducing agent selected from the group consisting of hydroxylamine salts, ascorbic acid, sulfamic acid, nitrite compounds, nitrogen oxide compounds and mixtures thereof is added to said solution.

12. A process according to claim 9 wherein a quaternary ammonium compound selected from the group consisting of laurylbenzyldimethyl ammonium chloride and distearyldimethyl ammonium chloride is added to said cesium nitrate solution.

13. A process according to claim 12 wherein the concentration of said ammonium compound is from $1.5 \times 10^{-4}$ to $10^{-3}$ moles per liter.

14. A process for the separation of a substance present in a solution in its salt form which comprises:

(a) contacting said solution containing the substance to be separated with a fine colloidal dispersion of a solid composed of a mixed ferrocyanide of monovalent cations and cations of an element selected from the group consisting of copper, zinc, iron, cobalt and nickel, said solid being insoluble in the solvent of the solution containing the substance to be separated and being dispersed in a liquid which is immiscible with said solvent of the solution containing the substance to be separated, so as to fix the substance to be separated on said solid;

(b) separating the phases thereby obtained; and (c) contacting an aqueous solution in the presence of cyanide anions with the phase containing the solid having the substance to be separated fixed thereon so as to extract said substance from said solid.

15. A process according to claim 14 wherein the initial solution containing the substance to be separated is an aqueous solution and the liquid in which the solid is dispersed is an organic liquid.

16. A process according to claim 15 wherein the substance to be separated is selected from the group consisting of strontium and cesium in the form of their nitrate salts.

17. A process according to claim 7 wherein the cyanide anions are supplied by the addition of an alkaline cyanide to said aqueous medium.

18. A process according to claim 7 wherein the cyanide anions are supplied by the addition of quaternary ammonium cyanide to said water immiscible liquid containing said dispersion of ferrocyanide.

References Cited

UNITED STATES PATENTS

| | | | |
|---|---|---|---|
| 2,717,696 | 9/1955 | Schubert | 23—337 X |
| 2,769,780 | 11/1956 | Clifford et al. | 252—301.1 |
| 2,819,144 | 1/1958 | Seaborg et al. | 23—337 |
| 2,918,366 | 12/1959 | Buyers et al. | 252—301.1 |
| 2,952,640 | 9/1960 | Goodall | 252—301.1 |
| 2,952,641 | 9/1960 | McKenzie | 252—301.1 |
| 3,101,998 | 8/1963 | Milliken et al. | 252—301.1 X |
| 3,112,275 | 11/1963 | Pollock et al. | 252—301.1 |
| 3,154,500 | 10/1964 | Jansen et al. | 252—301.1 |
| 3,167,504 | 1/1965 | Haden et al. | 252—301.1 |
| 3,196,106 | 7/1965 | Haden et al. | 252—301.1 X |

OTHER REFERENCES

Nuclear Science Abstracts, NSA–15867, vol. 17, No. 10, May 31, 1963.

L. DEWAYNE RUTLEDGE, *Primary Examiner.*

BENJAMIN R. PADGETT, *Examiner.*

S. J. LECHERT, JR., *Assistant Examiner.*